Dec. 23, 1952  F. E. BRADY, JR  2,622,531
FLUID PRESSURE SYSTEM
Filed Oct. 4, 1946
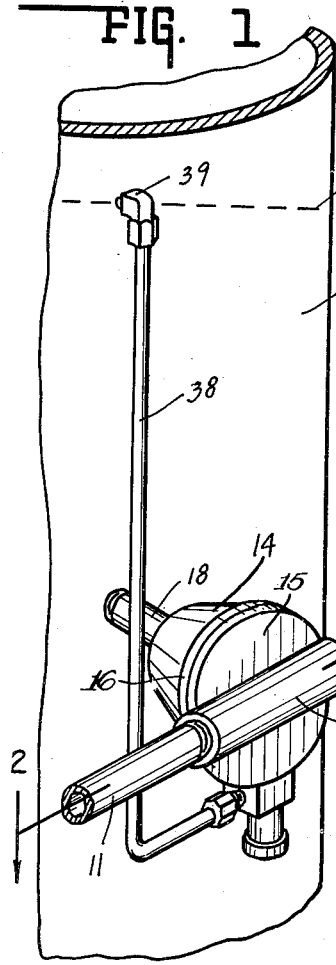
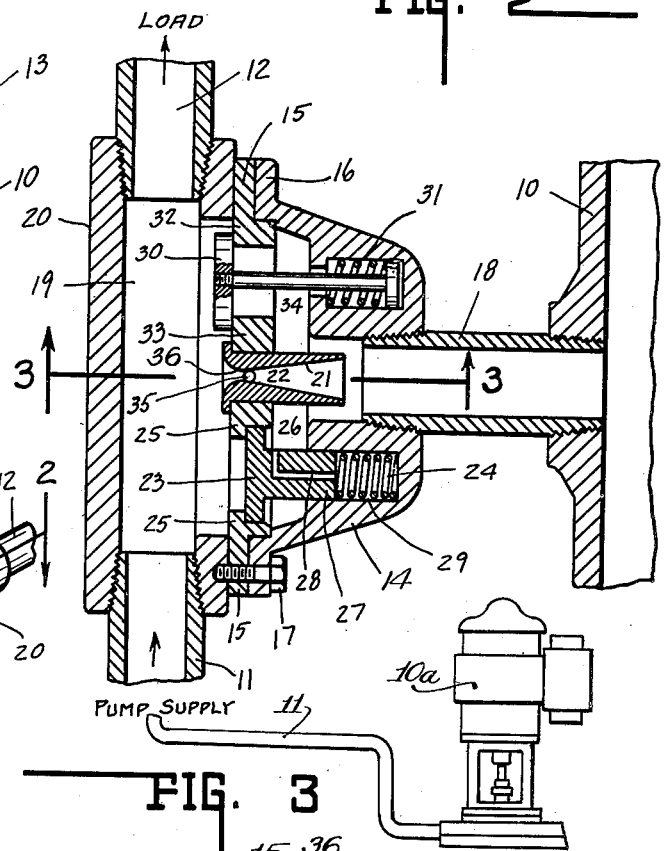
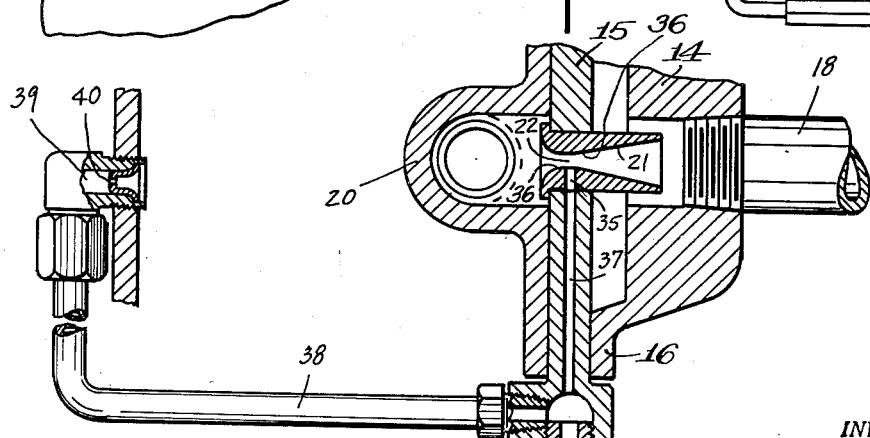
INVENTOR.
FRANCIS E. BRADY, JR.
BY Lockwood Goldsmith & Platt
ATTORNEYS.

Patented Dec. 23, 1952

2,622,531

UNITED STATES PATENT OFFICE 2,622,531

FLUID PRESSURE SYSTEM

Francis E. Brady, Jr., Muncie, Ind.

Application October 4, 1946, Serial No. 701,360

4 Claims. (Cl. 103—6)

This invention relates to fluid pressure apparatus and more particularly to fluid pressure systems incorporating a liquid tank or the like for maintaining a quantity of liquid under a predetermined pressure.

The chief object of the invention is to provide a single and reliable fluid pressure system having means for automatically maintaining a predetermined cushion of air or other gas in the liquid supply tank above the liquid level therein.

In fluid pressure systems, a fluid pressure tank is frequently used to receive liquid from a pump and to store the liquid under predetermined pressure conditions. In such systems where the liquid is water or the like capable of absorbing the air or other gas which forms an expansible cushion over the top of the liquid, it is well known that the liquid level tends to rise since some of the air or other gas forming the cushion is absorbed. As this absorption takes place the cushion or head of air becomes too small to be of service. In order to draw liquid from the system, reliance is placed upon the pump which consequently starts and stops too frequently. This condition, commonly known as "waterlogging," results in a great amount of strain upon the pump and motor, which causes burned out switches and excessive wear necessitating frequent repair. It is, therefore, imperative that the air cushion be restored and replenished so that "waterlogging" will be avoided.

One feature of the invention resides in the construction and mounting of an air supply tube and other associated means in such relation to a venturi that the air cushion within the tank may be automatically replenished and maintained. For this purpose one end of the tube is so mounted that it opens at the throat of a venturi positioned between the tank supply line and the tank. The other end of the tube is connected to the tank at a predetermined air cushion level therein by a conduit, and to the outside air by an air relief valve.

As liquid flows through the restricted orifice of the venturi, its velocity is greatly increased causing a partial vacuum to occur. As a result of the vacuum, the air supply tube is subjected to a rather high degree of suction. In the event the liquid level in the tank is above the point of connection of the conduit thereto, the suction is greater and is sufficient to cause the air relief valve to admit outside air through the air supply tube into the supply of liquid entering the tank. The supply of air within the tank is thereby automatically replenished.

Another feature of the invention resides in the construction of a control unit such as will permit a substantial flow of liquid from the source of supply to the tank while at the same time forcing liquid through the restricted orifice of the venturi which is essential to the operation of the invention. This is accomplished by the provision of a pressure releasable plunger valve which yields to the pressure of liquid flowing from the tank supply line to the tank and of a second oppositely acting pressure releasable plunger valve which yields to the pressure of liquid flowing from the tank to the outlet line. Between the by-passes, the venturi is positioned, through the restricted orifice of which liquid can flow in either direction.

Still another feature of the invention resides in the construction of one of the pressure releasable valves such as to permit a supply of liquid to reach the chamber housing the spring actuating the valve and thereby to create a differential in the pressure required to cause the valve to yield. The extent of the differential is dependent upon the size of a passage formed in the valve. This passage connects the chamber housing the spring to the supply of liquid. As a result of this feature, instead of immediately bypassing the valve, the liquid from the pump supply is initially forced under even greater pressure than otherwise through the orifice of the venturi thereby creating a greater vacuum and consequently a higher degree of suction.

The full nature of the invention will be understood from the accompanying drawings and the following description and claims:

Fig. 1 is a perspective view of the fluid pressure system with parts broken away.

Fig. 2 is a horizontal section of the control unit on the line 2—2 of Fig. 1 in the direction of the arrows.

Fig. 3 is a vertical section of the control unit taken on the line 3—3 of Fig. 2 in the direction of the arrows.

In fluid pressure systems a fluid pressure tank is frequently used to receive liquid from a pump or the like and to store the liquid under predetermined pressure conditions. In such systems if the pressure within the tank falls below a predetermined limit a switch is automatically closed and a pump is set into operation until a predetermined pressure limit is reached whereupon the switch is automatically opened.

In the drawings there is shown such a pressure tank 10 which is supplied with water or other liquid from the pump 10a through the supply pipe 11. In order to maintain an air cushion or head above the liquid within the tank sufficient to force the liquid through the load pipe 12 to the point of service it is imperative that the tank not be filled above the liquid level 13. It is a well-known fact, however, that water or the like has a tendency to absorb air. As a consequence, it is found that the liquid tends to rise above the level 13, but as it rises the air cushion is replenished automatically by means of an air supply device shown in section in Fig. 3.

The air supply device is housed in a casing 14 preferably constructed of two casing walls 15 and 16 which are bolted together by screws, one of which is shown at 17. The casing 14 is supported upon the side of the tank by the connecting fitting 18 to provide communication between the interior of the tank and the chamber 19.

The chamber 19 is fashioned out of the outwardly extending, spherically formed protuberance 20 which is integral with the casing wall 15 and which is threaded on opposing ends to receive the pump supply pipe 11 and the load pipe 12, respectively.

Centrally positioned in the casing is a venturi 21 through the restricted orifice 22 of which liquid flows either from the supply pipe 11 to the tank 10 when the pump is operating or from the tank to the load pipe 12 when the liquid is drawn at the point of service.

Adjacent the supply pipe side of the venturi is positioned a piston valve 23 which normally is held tightly by the spring 24 against the rigid valve seat 25. When the pump is operating, liquid is forced through the supply pipe 11 into the chamber 19. The pressure of the liquid is sufficient to overcome the tension of the spring 24 and the valve is forced rearwardly permitting the passage of liquid through the passage thereby created into the chamber 26 adjacent the venturi and thence through the connecting fitting 18 into the tank. In order to restrain the rearward movement of the valve 23 and force liquid through the venturi, there is provided in the piston rod 27 thereof a by-pass exhaust or passage 28 which connects the chamber 29 housing the spring 24 and the chamber 26 adjacent the venturi. This passage permits the entrance of the liquid into the spring chamber 29 which further restrains the rearward movement of the piston. The flow of the liquid from the supply pipe 11 is thereby forced under considerable pressure through the restricted orifice of the venturi until sufficient pressure is created to force the piston valve rearwardly.

Adjacent the opposing side of the venturi is a second and oppositely acting check valve 30 which normally is held tightly by the spring 31 against the valve seats 32 and 33. When the liquid service supplied by the tank is in use the liquid flows from the tank under the pressure of the air cushion, through the connecting fitting 18 into the chamber 34 forcing the valve 30 outwardly against the constraint of the spring 31 thereby permitting the liquid to flow into the chamber 19 and thence into the load pipe 12 to the point of service.

Opening at the throat 36 of the venturi is a suction tube 35. This tube is connected by means of the passage 37 to a conduit 38 which is secured to the tank at the predetermined liquid level 13 therein. At the end 39 of the conduit is a restricted orifice 40 which places the conduit in restricted communication with the interior of the tank. The orifice is small enough to offer a comparatively high resistance to the rapid flow of water through it, although air or other gas can move through the passage rapidly enough to prevent a high degree of suction in the conduit and suction tube when the pump is operating.

The suction tube is also in communication with the outside air through an air intake port having a spring actuated ball check valve 41, the spring 42 of which normally holds the ball tightly against the valve seat 43. The spring 42 is strong enough to hold the ball valve 41 closed when suction is created by the passage of water through the venturi, provided there is at the same time a flow of air through the restricted orifice 40 from the tank 10 to the conduit 38.

This occurs if there is sufficient air or other gas in the space above the liquid, at which time the liquid in the tank is below the liquid level 13. In such event the suction serves merely to draw air from the tank into the conduit, and recirculates it through the suction tube and its connecting means into the tank 10 adding no additional air from the outside.

If, however, the liquid in the tank is above the level 13 when the pump starts, it is then desirable to add more air to the tank to restore the liquid level 13 therein and to replenish the air cushion above it. Under these circumstances the addition of the air automatically occurs because the suction developed by the passage of liquid through the restricted orifice of the venturi is sufficient to overcome the tension of the spring 42. The suction is increased when the liquid is above the level 13 since the resistance offered by the orifice 40 is too great for the rapid flow of water therethrough. The charge of outside air drawn through the ball valve together with whatever liquid leaks slowly into the conduit through the orifice 40 will then be injected through the passage 37, the suction tube 35, and the connecting fitting 18, respectively, into the tank where it will bubble to the top.

It will thus be seen that the amount of air in the tank will be maintained substantially constant and will be maintained without requiring the attention of the operator.

While the form of apparatus herein described constitutes a preferred embodiment of the invention, it is to be understood that the invention is not limited to this precise form of apparatus, and that changes may be made therein without departing from the scope of the invention which is defined in the appended claims.

The invention claimed is:

1. In a pressure system including a liquid pressure tank and a pump therefor, an air replenishing device having a liquid chamber communicating with the pressure side of said pump, a Venturi type tube interposed between said chamber and tank through which liquid is forced by said pump under pressure, an auxiliary passage between said chamber and tank having a spring controlled check valve therein for permitting liquid under pressure to pass from said tank to said chamber by-passing said tube, a conduit connecting the restricted throat of said tube with said tank at a predetermined liquid level therein, said conduit having a restricted orifice at said level of a character to freely pass air and restrain the passage of liquid, and a port having a normally closed check valve connecting said conduit with the atmosphere through which air is admitted to the liquid passing through said Venturi tube upon the liquid level in said tank being above said orifice and resisting the admission of air upon said liquid level being below said orifice.

2. In a fluid pressure system including a liquid pressure tank and a pump therefor, an air replenishing device having a liquid chamber communicating with the pressure side of said pump and with a service outlet, a Venturi type tube interposed between said chamber and tank through which liquid is forced by said pump under pressure, an auxiliary passage between said chamber and tank having a normally closed spring pressed piston valve provided with a passage therein for transmitting liquid from said tank through the piston valve for exerting fluid pressure thereon in its closing direction, said valve being operable to open against said liquid and spring pressure under pressure from said pump to admit passage of liquid to said tank, and a passage between the restricted throat of said Venturi tube and a predetermined liquid level in said tank, said passage including means for admitting air from the atmosphere directly to said Venturi tube upon the liquid level in said tank extending above said predetermined level.

3. In a fluid pressure system including a liquid pressure tank and a pump therefor, an air replenishing device having a Venturi type tube communicating between the pressure side of said pump and said tank through which liquid is forced under pressure, an auxiliary passage between said pump and tank, and a normally closed check valve spring actuated to oppose the passage of liquid through said auxiliary passage, said valve including a piston reciprocally mounted in a cylinder and provided with a communicating conduit between said cylinder and tank for transmitting a differential liquid pressure on said piston as between the pressure in said tank and the pressure side of said pump, and a suction conduit connecting the restricted throat of said Venturi tube with said tank at a predetermined liquid level provided with control means operable to draw air from the atmosphere into said tube upon the liquid being above said predetermined level and draw air from said tank upon the liquid therein being below said predetermined level.

4. In a fluid pressure system including a liquid pressure tank and a pump therefor, an air replenishing device having a liquid chamber communicating with the pressure side of said pump and with a service outlet, a Venturi type tube interposed between said chamber and tank through which liquid is forced by said pump under pressure, a conduit connecting the restricted throat of said tube with said tank at a predetermined liquid level therein, said conduit having a restricted orifice at said level of a character to freely pass air and restrain the passage of liquid, a port having a normally closed check valve connecting said conduit with the atmosphere through which air is admitted to the liquid passing through said Venturi tube upon the liquid level in said tank being above said orifice, and resisting the admission of air upon said liquid level being below said orifice, an auxiliary passage between said chamber and tank having a spring controlled check valve therein operable to permit liquid to pass under pressure from said tank to the service outlet of said chamber by-passing said tube, a second auxiliary passage between said chamber and tank having a normally closed piston valve therein through which liquid may pass under pressure from the pump supply line to said tank by-passing said tube, said piston valve having a passage therein communicating between the tank side of said valve and the end of the piston for creating a differential liquid pressure thereon as between the pressure in said tank and liquid chamber.

FRANCIS E. BRADY, JR.

REFERENCES CITED

The following references are of record in the file of this patent:

UNITED STATES PATENTS

| Number | Name | Date |
|---|---|---|
| 2,347,472 | Dorward | Apr. 25, 1944 |
| 2,421,237 | Bergh | May 27, 1947 |